United States Patent [19]

Wilkins

[11] 4,162,782

[45] Jul. 31, 1979

[54] SEAL ASSEMBLY FOR BUTTERFLY VALVE

[75] Inventor: Ronald D. Wilkins, Houston, Tex.

[73] Assignee: ACF Industries, Incorporated, New York, N.Y.

[21] Appl. No.: 894,787

[22] Filed: Apr. 10, 1978

[51] Int. Cl.² ............................................ F16K 25/00
[52] U.S. Cl. .................................... 251/173; 251/174; 251/305; 251/306
[58] Field of Search ............... 251/171, 173, 306, 305, 251/174

[56] References Cited

U.S. PATENT DOCUMENTS

| | | | |
|---|---|---|---|
| 3,409,269 | 11/1968 | Fawkes | 251/306 X |
| 4,037,819 | 7/1977 | Kindersley | 251/306 |

FOREIGN PATENT DOCUMENTS

| | | | |
|---|---|---|---|
| 914336 | 7/1954 | Fed. Rep. of Germany | 251/171 |
| 2648519 | 10/1976 | Fed. Rep. of Germany | 251/306 |

*Primary Examiner*—Harold W. Weakley
*Attorney, Agent, or Firm*—Eugene N. Riddle

[57] ABSTRACT

A butterfly valve has a valve body with an improved seal assembly mounted in the groove about a flow passage in the valve body. The seal assembly has an outer metal body including a pair of spaced inner legs having outer ends thereof in sealing contact with the outer periphery of a valve disc in the closed position of the valve disc to provide a pair of spaced metal sealing surfaces with the outer periphery of the disc. An elastomeric face seal is positioned between the two spaced inner legs in sealing contact between the spaced metal sealing surfaces with the outer peripheral sealing surface of the valve disc at low pressures. An upstream inner leg is urged inwardly toward the downstream inner leg to space the upstream leg from the adjacent surface defining the groove and permit the upstream pressure to be exposed between the inner and outer upstream resilient legs thereby to urge the upstream leg tightly into contact with the adjacent peripheral sealing surface of the valve disc in the closed position thereof. The outer resilient legs are seated in the bottom of the groove to provide a substantially fluid-tight contact with the adjacent surfaces of the groove, and the inner legs are urged upon contact with the valve disc away from the valve disc toward the outer seated legs thereby to load the seal assembly with a predetermined preload pressure. Fluid is prevented by the outer legs from flowing behind the seal assembly.

23 Claims, 9 Drawing Figures

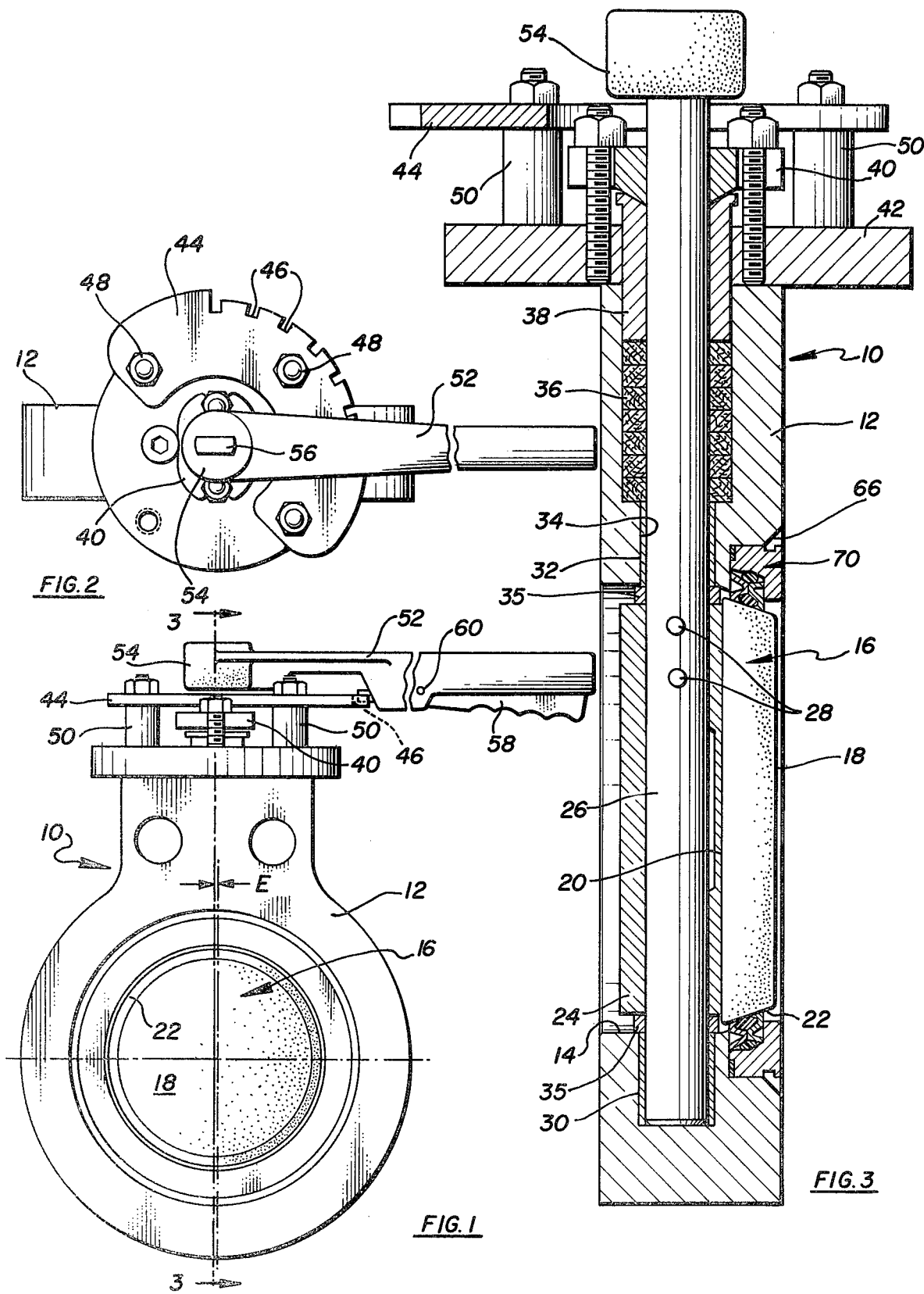

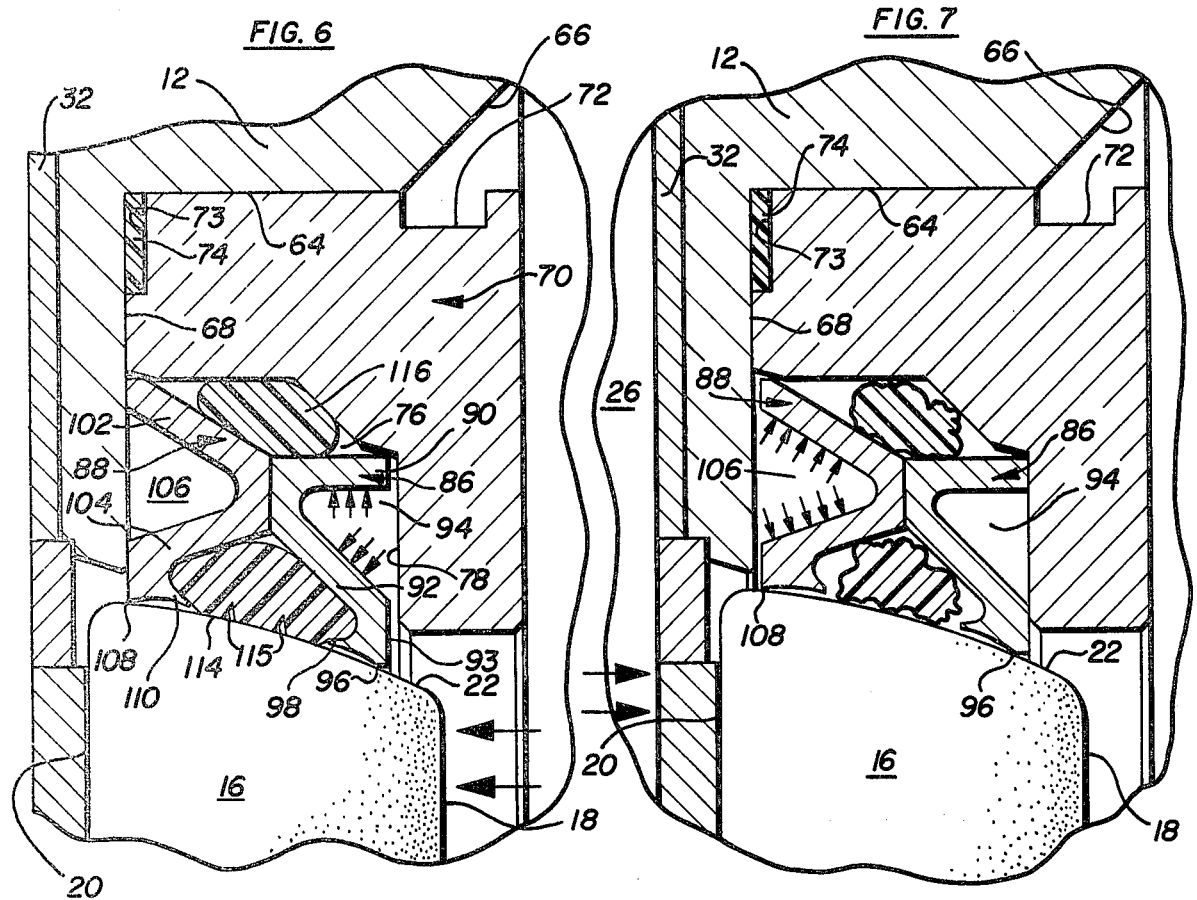
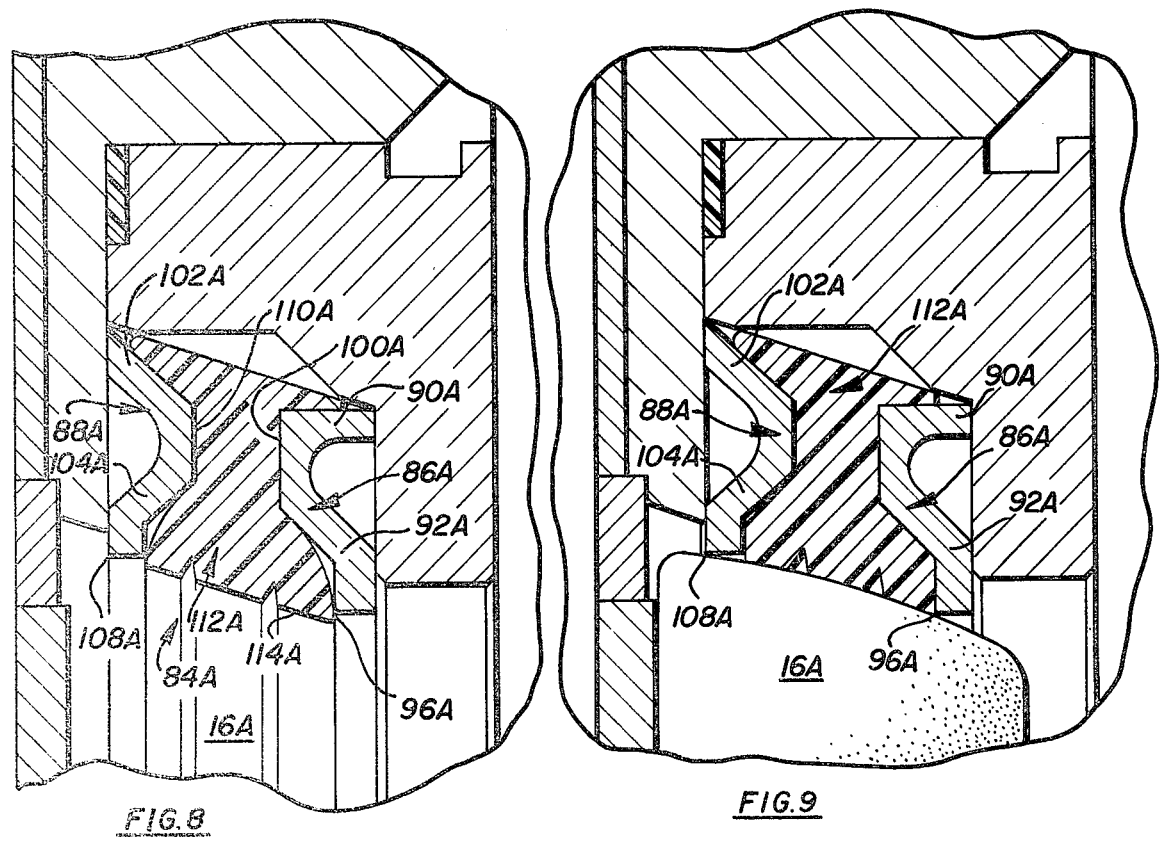

SEAL ASSEMBLY FOR BUTTERFLY VALVE

BACKGROUND OF THE INVENTION

Heretofore, the prior art has included seat or seal assemblies for butterfly valves in which both metal and elastomeric sealing surfaces have been provided. For example, U.S. Pat. No. 3,986,699 dated Oct. 19, 1976 and an article on pages 95 and 96 of "Chemical Engineering" dated Oct. 10, 1977 show butterfly valves in which a seat assembly includes both metal and elastomeric sealing surfaces for contacting the valve disc in the closed position thereof. However, both of the prior art structures show arrangements in which fluid pressure from the upstream side is provided behind the seal assembly to aid in urging the seal assembly inwardly into engagement with the adjacent sealing surface of the disc. In addition, a separate elastomeric backing ring is provided in these prior art structures behind the seal assembly to urge the seal assembly inwardly into tight engagement with the adjacent peripheral sealing surface of the valve disc.

It is highly desirable not to have to rely on fluid pressure getting behind the seal assembly in order to urge the seal assembly inwardly as there is a possibility that the seal assembly could malfunction and perhaps fluid would be obstructed in getting behind the seal assembly. Even in the event of a separate O-ring being provided behind the seal assembly, such an O-ring might be damaged or at least partially consumed during a fire or the like and could not be relied upon to urge the seal assembly inwardly as might be necessary under emergency conditions. Also, the fluid pressure on the upstream or downstream side might not be sufficiently high to pass between the sides of the groove and the valve assembly for flowing behind the seal assembly.

DESCRIPTION OF THE PRESENT INVENTION

The present invention is directed to a seal assembly for a butterfly valve in which a three-point metal and resilient sealing is provided by having three separate sealing surfaces contacting the valve disc. The sealing surfaces are defined by a pair of inner spaced legs which have inner ends contacting the peripheral surface of the valve disc, and an elastomeric resilient seal between the pair of inner legs in sealing engagement with the valve disc.

The improved seal assembly for a butterfly valve is mounted in a groove about the flow passge and comprises an outer metallic body and an elastomeric face seal. The metallic body includes a pair of outer resilient legs having outer ends contacting and seated in the bottom of the groove, and a pair of spaced inner legs having outer ends contacting the outer periphery of the valve disc. When the seal assembly is loaded upon movement of the valve disc to a closed position, the inner legs are urged inwardly relative to the fixed ends of the outer legs thereby to provide a preloading of the seal assembly with the inner legs being urged continuously into engagement with the valve disc. No separate elements are necessary or required to urge the seal assembly into engagement with the valve disc as the resilience of the metal body continuously urges the inner ends of the inner legs outwardly into sealing contact with the valve disc. The outer ends of the outer legs form a substantially fluid-tight sealing contact with the adjacent surfaces defining the groove but even in the event that fluid pressure might, under certain conditions, leak behind the seal assembly, the seal assembly would be operable and functioning.

When the upstream inner leg is exposed to fluid pressure from the upstream side, the upstream leg is urged downstream and is spaced slightly from the adjacent surface defining the groove so that fluid pressure may enter behind the upstream inner leg and urge the inner leg inwardly into tight sealing relation with the adjacent valve disc. The fluid pressure likewise urges the upstream outer leg outwardly into tight engagement with the surface defining the groove, and the downstream inner leg is urged into contact with the adjacent surface defining the groove. By urging the inner leg on the upstream side toward the inner leg on the downstream side, the elastomeric seal between the spaced inner legs is squeezed thereby to urge the elastomeric face seal into tight sealing relation with the adjacent face of the valve disc. The seal assembly functions in the same manner regardless of the direction of flow through the flow passage.

Various other objects and features of this invention will become apparent to those skilled in the art from the following discussion, taken in conjunction with the accompanying drawings in which:

FIG. 1 is an end elevation of a butterfly valve structure which incorporates the seal assembly comprising the present invention;

FIG. 2 is a top plan of the butterfly valve shown in FIG. 1;

FIG. 3 is an enlarged section taken generally along lines 3—3 of FIG. 1;

FIG. 6 is an enlarged section of the seal assembly of FIG. 4 shown in contact with the valve disc and exposed to fluid pressure from an upstream direction from the right as viewed in FIG. 6;

FIG. 7 is an enlarged section of the seal assembly of FIGS. 4–6 but showing the seal assembly after the seal assembly has been exposed to high temperatures that consume or deteriorate the plastic sealing elements;

Figure 4:
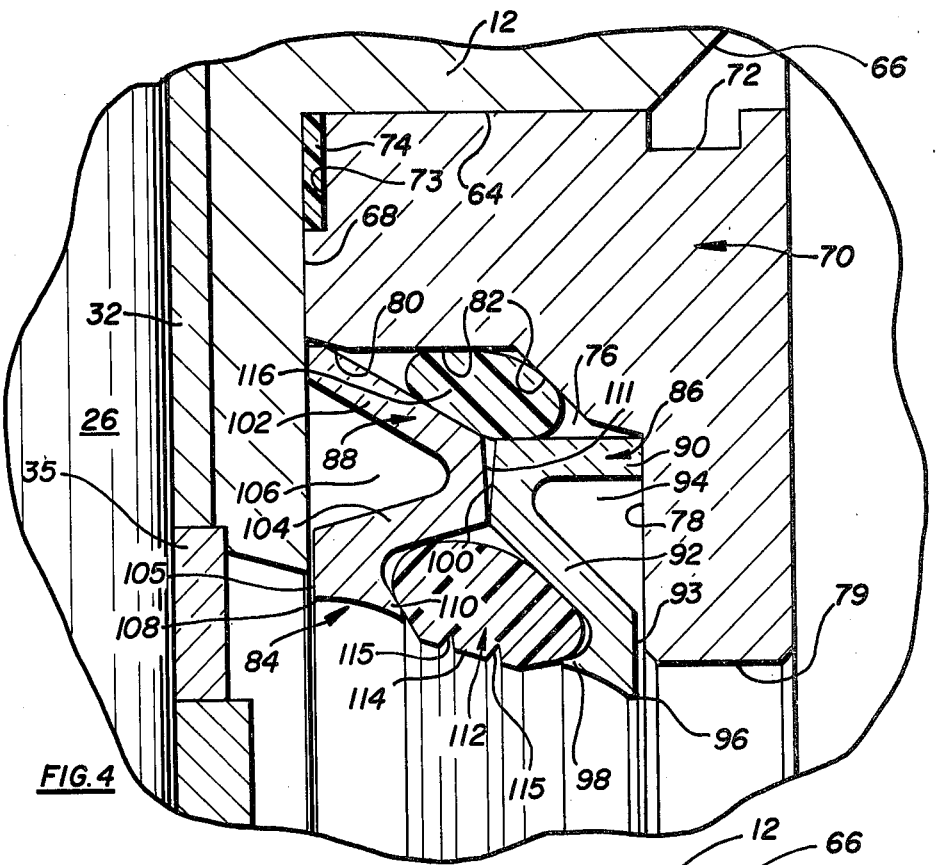
FIG. 4 is an enlarged section of the seal assembly shown in a free position with the valve disc being in an open position out of contact with the seal assembly.

FIG. 8 is an enlarged section of another embodiment of the seal assembly in which an intermediate elastomeric seal separates a pair of outer metal seal rings and is gripped between the metal rings, the seal assembly being shown in the free position of the valve disc; and FIG. 9 is an enlarged section of the embodiment in FIG. 8 illustrating the seal assembly in the closed position of the valve disc and in contact therewith.

Referring now to the drawings for a better understanding of the invention and more particularly to the embodiment shown in FIGS. 1–7, the butterfly valve structure is indicated generally at 10 and comprises a body 12 having a flow passage 14 therethrough. A butterfly valve disc indicated generally at 16 is mounted within the flow passage for movement between open and closed positions and comprises a front fact 18, a rear face 20, and an outer peripheral surface 22 extending about the outer periphery of the valve disc 16 and forming a generally spherical seal surface. Rear face 20 has an integral sleeve 24 and a shaft 26 fitting within sleeve 24 is secured by suitable pins 28 to sleeve 24 for connecting valve disc 16 for rotation with shaft 26. The axis of rotation of shaft 26 is offset a distance "E" from the centerline of disc 16 which may, for example, be around 0.060 inch for a disc having a diameter of six (6) inches.

Body 12 has a bore 34 receiving shaft 26. A lower bearing 30 in the lower end of bore 34 and an upper bearing 32 within upper bore 34 fits around shaft 36. Suitable bushings 35 are positioned between sleeve 24 and bearings 30,32. A packing material 36 is engaged by a follower 38. A bonnet cap 40 engages the upper end portion of follower 38 and is mounted over a mounting plate 42 by suitable studs and nuts. Also mounted on mounting plate 42 is a ratchet plate 44 having notches 46 therein. Suitable studs 48 hold ratchet plate 44 on spacers 50 which, in turn, are mounted on mounting plate 42 in supported relation thereto.

A handle 52 has a hub 54 which receives a reduced diameter shaft end 56 of an elongated cross-section whereby shaft 26 is rotated by handle 52. Handle 52 carries a ratchet lever 58 thereon which is pivotally connected at 60 to handle 52. The outer end of lever 58 has a pin which is adapted to fit selectively within notches 46 for positioning valve disc 16 at a desired position with respect to flow pasage 14.

Referring now to FIG. 4, in which the seal assembly comprising the present invention is illustrated, body 12 has an annular groove therein about flow passage 14 defining an outer peripheral wall surface 64 which is flared by a tapered corner surface 66, and a bottom surface 68. A seat retainer ring generally indicated at 70 is pressed within the annular groove in body 12 and has an outer annular groove 72 for extracting seat ring 70 when desired for replacement or the like. The outer corner of ring 70 is notched at 73 and a suitable gasket 74 is positioned therein between ring 70 and body 12 to provide a fluid-tight seal.

Seat retainer ring 70 has a groove 76 about its inner periphery 79. Groove 76 defines a side surface 78 which is generally parallel to the bottom surface 68 of the body groove, and a bottom surface 80 having a deep portion thereof formed by a pair of V-shaped surfaces 82. Mounted in groove 76 is seal assemby 84 defining the present invention and including a pair of outer metal rings 86 and 88 generally V-shaped in cross-section. Metal ring 86 has an outer metal leg 90 and an inner metal leg 92 forming a V-shaped space 94 therebetween. The inner free edge portion 96 of inner leg 92 engages peripheral surface 22 of valve disc 16 in the closed position thereof. An inwardly extending lip 98 extends inwardly from leg 92. Lip 98 is spaced from the adjacent peripheral surface 22 of valve disc 16. The apex of the generally V-shaped metal ring 86 is flattened to form a flat or planar surface 100.

Metal ring 88 includes an outer metal leg 102 and an inner metal leg 104 having a V-shaped space 106 therebetween. An inner free edge portion 108 of inner leg 104 engages in sealing relation the adjacent peripheral sealing surface 22 of valve disc 16 in the closed position thereof. Leg 104 includes an inwardly extending lip 110 which is spaced from the adjacent sealing surface 22 of valve disc 16 in the closed position of valve disc 16. The apex of V-shaped ring 88 is flattened to form a flat or planar surface 111. While metal rings 86 and 88 have been illustrated as being generally V-shaped in cross-section, it is to be understood that metal rings 86 and 88 might be formed of different cross-sectional shapes and function satisfactorily, such as a channel shaped cross-section.

Figure 5:
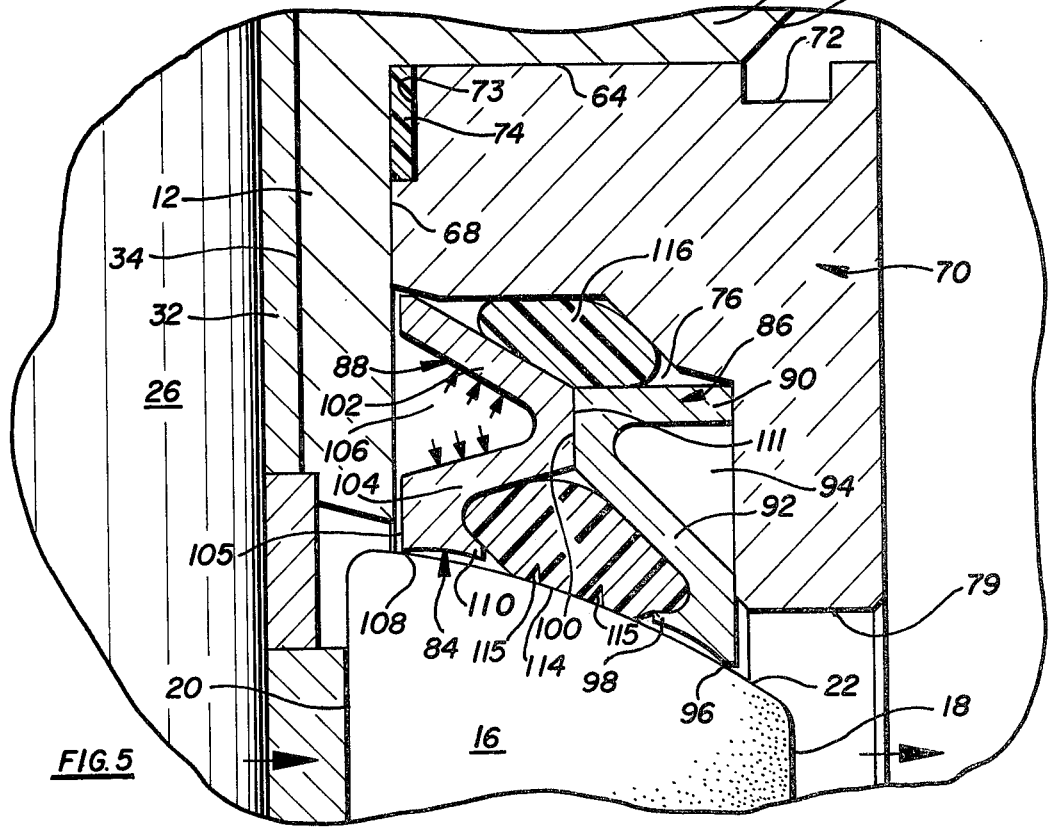
FIG. 5 is an enlarged section of the seal assembly of FIG. 4 shown in contact with the valve disc in the closed position thereof and exposed to fluid pressure from an upstream direction from the left as viewed in FIG. 5.

An elastomeric resilient face seal is indicated generally at 112 and has a front face 114 which in a free position out of contact with disc 16 projects beyond the adjacent free edge portions 98 and 108. Resilient face seal 112 is adapted to engage in sealing contact the adjacent sealing peripheral surface 22 of valve disc 16 when the valve disc is in a closed position as shown in FIG. 5. Face 114 has a pair of spaced grooves 115 therein which permit small particles of grit or foreign matter to become trapped therein rather than being carried across adjacent surface 22 of disc 16 and possibly scratching surface 22. Front face 114 may project, for example, in a relaxed condition around 0.010 inch beyond edge portions 96 and 108. Seal 112 is retained between metal rings 86 and 88 by respective lips 98 and 110. An O-ring 116 is positioned in groove 76 behind rings 86 and 88 in contact with and squeezed between bottom surface 80 and outer legs 90 and 102 of respective rings 86 and 88. Outer legs 90 and 102 are seated in the bottom of groove 76 and the free edge portions of legs 90 and 102 are in substantial fluid-tight metal-to-metal sealing relation with the adjacent respective wall surfaces 78 and 68 defining groove 76. O-ring 116 may preferably be formed of rubber or a rubberlike material while face seal 112 may be formed of tetrafluoroethylene, nylon, or rubberlike material, for example. The term "elastomeric" as defined in the claims is interpreted as including all suitable resilient materials, such as nylon, tetrafluoroethylene, buna-N rubber, and the other suitable plastic materials, for example.

Referring to FIG. 4 in which seal assembly 84 is shown in a free relaxed condition out of contact with valve disc 16 in the open position, legs 90 and 102 in general sealing relation with wall surfaces 78 and 68. Inner legs 92 and 104 have outer flat surfaces thereof indicated at 93 and 105 which are spaced slightly from the adjacent facing surfaces 78 and 68 defining the parallel side surfaces of groove 76. Flat surfaces 100 and 111 have a generally inverted V-shaped space therebetween in such relaxed condition as shown clearly in FIG. 4. When valve disc 16 is moved to a closed position as shown in FIG. 5 with the upstream direction being from the left viewing FIG. 5, inner metal legs 92 and 104 are urged upwardly around 0.004 inch, for example, for a valve disc having a diameter of six (6) inches, relative to outer metal legs 90 and 102. The relative movement of legs 92 and 104 outwardly effects a tight seal engagement with the adjacent wall surfaces 78 and 68 respectively. Outer face 114 of face seal 112 is compressed against the adjacent peripheral sealing surface 22 to provide a relative large area of contact surface with peripheral surface 22. Edge sealing portions 96 and 108 are urged into tight sealing contact with sealing surface 22. Thus, three (3) separate sealing surfaces are provided against outer peripheral surface 22 of valve disc 16, two metal sealing surfaces at edges 96 and 108, and one relatively soft but large contact area nonmetal sealing surface along surface 114 of face seal 112.

As shown in FIG. 5, upstream fluid pressure urges upstream leg 104 away from adjacent wall surface 68 to space surface 105 of leg 104 from the adjacent surface and permit upstream fluid pressure in the V-shaped space 106 thereby to urge leg 104 inwardly into tight sealing contact with valve disc 16 and leg 102 outwardly into tighter sealing contact with the adjacent surfaces. Metal rings 86 and 88 act as an "X" structure and will seal against pressure from either direction. Referring to FIG. 6, the upstream side is shown from the right viewing FIG. 6 and leg 92 having surface 93 thereon is spaced from the adjacent surface 78 of groove 76 and fluid pressure leaks into V-shaped space 94 to urge free edge portion 96 into tight sealing contact with the adjacent peripheral sealing surface 22 of disc 16. It is noted that lips 98 and 110 are spaced from the adjacent sealing surface 22 in the closed position of disc 16 and a suitable curvature is provided on the surfaces of legs 92 and 104 between lips 99 and 110 and free edge portions 96, 108 respectively so that a substantial line contact will be provided by free edge portions 96 and 108 against peripheral sealing surface 22. Under some conditions of use it is possible that face seal 112 might be omitted if adequate metal seals are provided by free edge portions 96 and 108.

When seal assembly 84 is initially assembled within groove 76, seat retainer ring 70 when pressed into position tightly urges rings 86 and 88 together so that a substantial fluid-tight sealing relation is provided between outer legs 90 and 102 and the adjacent sides defining groove 76. Thus, the present arrangement does not require and is not dependent upon any fluid pressure flowing behind seal assembly 84 to urge seal assembly 84 outwardly into engagement with valve disc 16. While O-ring 116 is provided behind rings 86 and 88, the seal assembly 84 would function adequately without O-ring 116. Thus, O-ring 116 is not required but may be desirable as a secondary seal behind rings 86 and 88 in the event fluid flows past outer legs 90 and 102 to restrict such fluid flow.

In the event of a fire or high temperature sufficient to consume or at least partially consume of deteriorate O-ring 116 and resilient seal 112 as shown in FIG. 7, an effective metal seal is maintained by edges 96 and 108 in substantially line contact with the adjacent sealing surface 22 of disc 16. Thus, a highly effective metallic sealing arrangement is provided by seal assembly 84. In the event very small scratches are present in edges 96 and 108 in the event of a fire, which partially consumes or deteriorates seal 112, particles of the partially consumed plastic material of which seal 112 is formed will tend to fill such scratches or deformations in edges 96 and 108 to provide a fluid-tight metal-to-metal seal even after seal 112 has deteriorated.

Referring now to FIGS. 8 and 9, a further embodiment of sealing assembly is shown in which a sealing assembly 84A is illustrated having a pair of metal rings 86A and 88A with upper legs 90A and 102A and lower legs 92A and 104A. Edges 96A of leg 92A and 108A of leg 104A engage in sealing contact the adjacent peripheral surface 22A of vlave disc 16A in the closed position thereof. Elastomeric face seal 112A has a face 114A in face sealing contact with peripheral surface 22A. Seal 112A is gripped between seal rings 86A and 88A and is maintained in such position by the generally V-shaped metal rings 86A and 88A. Flattened surfaces 100A and 110A tightly grip the intermediate portion of seal 112A therebetween. Seal 112A is positioned behind upper legs 90A and 102A and thereby tends to urge rings 86A and 88A outwardly. Sealing assembly 84A functions in the same manner as sealing assembly 84. FIG. 8 shows seal assembly 84A in a free unrestrained position out of contact with peripheral surface 22A of disc 16A while FIG. 9 shows seal assembly 84A in contact with the adjacent surface 22A and spring loaded by contact with peripheral surface 22A. It is apparent that a preloading of sealing assembly 84A against surface 22A can be predetermined by the tolerances and dimensions of sealing rings 86A and 88A adjacent peripheral surface 22A.

What is claimed is:

1. In a butterfly valve having a valve body with a flow passage therethrough, an annular groove in the body about the flow passage, and a valve disc mounted in the flow passage for movement between open and closed positions relative to the flow passage;
   an improved seal assembly mounted in said groove for sealing against the outer periphery of the valve disc in the closed position thereof, said seal assembly comprising a metallic body and an elastomeric face seal;
   said metallic body including a pair of outer resilient legs having outer ends contacting the bottom of the groove and a pair of spaced inner legs having outer ends contacting the outer periphery of the valve disc in the closed position of the valve disc to provide metal-to-metal sealing contact with the outer periphery of the disc along two spaced metallic sealing surfaces formed by the ends of the inner legs, said elastomeric face seal being positioned between the spaced inner legs and contacting the disc sealing surface in the closed position of the disc to provide sealing contact with the outer periphery of the disc along a sealing surface between the spaced metallic sealing surfaces;
   said resilient inner legs and said elastomeric face seal being deflected outwardly relative to said resilient outer legs upon engagement of said disc with the inner legs and face seal in the closed position thereby to bias the seal assembly against the valve disc for establishing the three aforementioned sealing surfaces between the seal assembly and the outer periphery of the valve disc in the closed position of the valve disc.

2. In a butterfly valve as set forth in claim 1 wherein one of said inner legs is adjacent the upstream side of the flow passage and is deflected downstream upon being exposed to upstream fluid pressure to permit the fluid pressure to enter the groove behind the upstream inner leg to urge the upstream inner leg into tight sealing contact with the valve disc.

3. In a butterfly valve as set forth in claim 1 wherein the outer ends of said outer legs are seated in said groove and are in substantially fluid-tight relation with the adjacent surfaces defining the groove to prevent fluid pressure from flowing behind the outer legs and behind the seal assembly.

4. In a butterfly valve having a valve body with a flow passage therethrough, an annular groove in the body about the flow passage, said groove defining generally parallel sides transverse to said flow passage and a bottom connecting the sides, and a valve disc mounted in the flow passage for movement between open and closed positions relative to the flow passage;
   an improved seal assembly mounted in said groove for sealing against the outer periphery of the valve disc in the closed position thereof, said seal assembly comprising a metallic body and an elastomeric face seal;
   said metallic body including a pair of outer resilient legs having outer ends contacting the bottom of the groove and a pair of spaced inner legs having inner ends contacting the outer periphery of the valve disc in the closed position of the valve disc to provide metal-to-metal sealing contact with the outer periphery of the disc along two spaced metallic sealing surfaces formed by the ends of the inner legs, said elastomeric face seal being positioned between spaced inner legs and contacting the disc sealing surface in the closed position of the disc to provide sealing contact with the outer periphery of the disc along a sealing surface between the spaced metallic sealing surfaces;

the ends of said resilient outer legs being seated at the juncture of the bottom and sides defining the groove with the area of the metallic body between the outer legs spaced from the body, said outer legs being in substantially fluid-tight relation with the bottom to prevent fluid pressure from flowing behind the seal assembly;

said resilient inner legs and said elastomeric face seal being deflected outwardly relative to said resilient outer legs upon engagement of said disc with the inner legs and face seal in the closed position thereby to bias the seal assembly against the valve disc for establishing the three aforementioned separate spaced sealing surfaces between the seal assembly and the outer periphery of the valve disc in the closed position of the valve disc.

5. In a butterfly valve as set forth in claim 4 wherein the inner leg adjacent the upstream side of the flow passage is deflected downstream upon being exposed to upstream fluid pressure to space the upstream inner leg from the adjacent side defining the groove thereby to permit the fluid pressure to enter the groove behind the upstream inner leg to urge the upstream inner leg into tight sealing contact with the valve disc, the downstream inner leg being urged by the upstream fluid pressure into engagement with the adjacent side defining said groove.

6. A valve of the type that includes a valve body having an inlet and an outlet and a connecting passageway for providing a flow path for fluid from the inlet to the outlet, wherein the valve comprises:

an annular groove circumscribing the passageway at a location between said inlet and said outlet, said groove defining generally parallel sides transverse to said passageway and a bottom connecting said sides;

a valve disc having an annular seal surface defined around the perimeter thereof mounted in said passageway for selective rotation between open and closed positions;

an annular seal assembly mounted in said groove and including a pair of annular seal rings mounted in juxtapositional relation to said annular groove with center portions of said seal rings being in contact with one another and peripheral portions thereof defining a pair of outwardly extending resilient legs and a pair of inwardly extending legs, said outwardly extending legs having outer ends thereof seated at the juncture of said groove bottom with the respective associated groove sides, said outwardly extending resilient legs being sufficiently deflected upon engagement of said disc with said inwardly extending legs to bias said seal assembly against said disc in order to establish a fluid-tight seal between said seal assembly, said disc and said valve body;

said inwardly extending legs defining a pair of spaced annular seal surfaces around the interior of said seal assembly, said pair of annular seal surfaces being engaged with said annular disc seal surface when said disc is in the closed position, such that the one of said seal rings which is in an upstream location is urged in the downstream direction by the upstream fluid pressure such that the annular seal surface thereof is urged into fluid-tight sealing relation with said annular disc seal surface; and said annular seal assembly having an annular resilient non-metallic annular seal element positioned between said inwardly extending legs, said non-metallic seal element in a free position extending inwardly beyond said spaced annular seal surfaces to establish an initial seal between said seal assembly and said disc annular seal surface when said disc is moved to the closed position.

7. A valve of the type that includes a valve body having an inlet and an outlet and a connecting passageway for providing a flow path for fluid from the inlet to the outlet, wherein the valve comprises:

an annular groove circumscribing the passageway at a location between said inlet and said outlet, said groove having generally parallel sides transverse to said passageway and a bottom connecting said sides;

a valve disc having an annular seal surface defined around the perimeter thereof mounted in said passageway for selective rotation between open and closed positions;

an annular seal assembly mounted in said groove and including a pair of annular metal seal rings mounted in said groove on opposite sides of an annular nonmetallic resilient seal ring, said metal seal rings together defining a pair of outwardly extending resilient legs and a pair of inwardly extending legs, said outwardly extending legs having outer ends thereof in contact with said groove bottom and the respective associated groove sides, said outwardly extending resilient legs being sufficiently deflected upon engagement of said disc with said inwardly extending legs to bias said seal assembly against said disc in order to establish a fluid-tight seal between said seal assembly, said disc and said valve body;

said inwardly extending legs defining a pair of spaced metal seal surfaces around the interior of said seal assembly, said pair of annular metal seal surfaces being engaged with said annular disc seal surface when said disc is in the closed position, the upstream metal seal ring being urged in the downstream direction by upstream fluid pressure such that the annular seal surface thereof is urged into fluid-tight sealing relation with said annular disc seal surface; and said resilient seal ring extending inwardly beyond said metal seal surfaces in a free position and operable to establish an initial seal against said disc annular seal surface when said disc is moved to a closed position.

8. A butterfly valve having a valve body with a flow passage therethrough, an annular groove in the body about the flow passage, said groove defining generally parallel sides transverse to said flow passage and a bottom connecting the sides and a valve disc mounted in the flow passage for movement between open and closed positions relative to the flow passage;

an improved seal assembly mounted in said groove for sealing against the outer periphery of the valve disc in the closed position thereof, said seal assembly comprising a metallic body and an elastomeric face seal;

said metallic body including a pair of generally V-shaped metal rings positioned with the apexes thereof in opposed relation, each metal ring including an inner leg having an inner end contacting the outer periphery of the valve disc in the closed position thereof and an outer leg seated in a generally fixed position within the groove, the inner legs of said rings being spaced and providing metal-to-metal sealing contact with the outer periphery of the disc along two spaced metallic sealing surfaces formed by the ends of the inner legs, said elastomeric face seal being positioned between the spaced inner legs and contacting said disc sealing surface in the closed position of the disc to provide sealing contact with the outer periphery of the disc along a sealing surface between the spaced metallic sealing surfaces;

said inner legs and said elastomeric face seal being deflected outwardly relative to said outer legs upon engagement of said disc with the inner legs and face seal in the closed position thereby to bias the seal assembly against the valve disc for establishing the three aforementioned separate spaced sealing surfaces between the seal assembly and the outer periphery of the valve disc in the closed position of the valve disc.

9. The butterfly valve as set forth in claim 8 wherein the apexes of said metal rings have generally flat surfaces and are in facing contact with each other.

10. The butterfly valve as set forth in claim 8 wherein the inner leg of the upstream metal ring is spaced from the adjacent surface defining the groove and fluid pressure is exposed to the space between the inner and outer legs to urge the inner leg into tight sealing engagement with the valve disc and to urge the outer leg into tight engagement with the adjacent surface defining the groove.

11. The butterfly valve as set forth in claim 8 wherein each inner leg has an inwardly extending lip on its outer end and the elastomeric face seal is retained between the inner legs by the inwardly extending lips.

12. The butterfly valve as set forth in claim 8 wherein the elastomeric face seal is positioned between and spaces the metal rings from each other, the face seal being gripped between the apexes of the metal rings and held in position therebetween.

13. The butterfly valve as set forth in claim 8 wherein said face seal has a pair of spaced grooves in its sealing surface to receive foreign matter thereby to minimize scratching of the adjacent sealing surface of the disc.

14. In a butterfly valve having a valve body with a flow passage therethrough, an annular groove in the body about the flow passage, and a valve disc mounted in the flow passage for movement between open and closed positions relative to the flow passage;

an improved seal assembly mounted in said groove for sealing against the outer periphery of the valve disc in the closed position thereof, said seal assembly comprising a metallic body including a pair of spaced outer resilient legs having outer ends seated in the groove and a pair of spaced inner legs having inner ends contacting the outer periphery of the valve disc in the closed position of the valve disc to provide metal-to-metal sealing contact with the outer periphery of the disc along two spaced metallic sealing surfaces formed by the ends of the inner legs;

said resilient inner legs being deflected and urged outwardly relative to said seated resilient outer legs upon engagement of said disc with the inner legs in the closed position thereby to bias the seal assembly against the valve disc with a predetermined loading for establishing a pair of spaced metal-to-metal sealing surfaces between the seal assembly and the outer periphery of the valve disc in the closed position of the valve disc.

15. In a butterfly valve as set forth in claim 14 wherein one of said inner legs is adjacent the upstream side of the flow passage and is deflected downstream upon being exposed to upstream fluid pressure to permit the fluid pressure to enter the groove behind the upstream inner leg to urge the upstream inner leg into tight sealing contact with the valve disc.

16. A butterfly valve having a valve body with an inlet and an outlet and a connecting passageway for providing a flow path for fluid from the inlet to the outlet, wherein the valve comprises:

an annular groove about the passageway at a location between said inlet and said outlet, said groove having generally parallel sides transverse to said passageway and a bottom connecting said sides;

a butterfly valve disc having an annular seal surface defined around the perimeter thereof mounted in said passageway for selective rotation between open and closed positions;

an annular seal assembly mounted in said groove and including a pair of annular metal seal rings mounted in said groove in opposed side-by-side facing relation to each other, each metal seal ring having an outer leg seated in the groove and an inner leg for contacting the disc in a metal-to-metal sealing relation, the inner legs being resilient and urged outwardly relative to the seated outer legs upon engagement with the disc to bias the seal assembly against the disc for establishing a pair of spaced metal-to-metal sealing surfaces in the closed position of the valve disc.

17. A butterfly valve as defined in claim 16 in which the upstream metal seal ring has an open space between the outer and inner legs thereof, the inner leg of said upstream seal ring being deflected downstream when exposed to upstream fluid pressure to permit fluid pressure to enter the open space between the legs thereby to urge the inner leg inwardly into tight sealing contact with the valve disc.

18. A butterfly valve as defined in claim 16 wherein said valve body has a second annular groove therein, and a seat retainer ring is fitted within said second annular groove, said retainer ring having about its inner periphery said first mentioned annular groove about the passageway and being press fitted within said second annular groove.

19. A butterfly valve having a valve body with a flow passage therethrough, an annular groove in the body about the flow passage, a butterfly valve disc mounted in the flow passage for rotative movement between open and closed positions;

an improved seal assembly mounted in said groove for sealing against the outer periphery of the valve disc in the closed position thereof, said seal assembly incuding a metallic body being generally X-shaped in cross-section to define a pair of spaced outer resilient legs and a pair of spaced inner resilient legs, said outer legs being seated in said groove and said inner legs having free ends contacting the outer sealing periphery of the valve disc in the closed position of the valve disc to provide a pair of spaced metal-to-metal sealing surfaces with the disc;

said resilient inner legs being urged outwardly relative to said seated resilient outer legs upon engagement of the disc with the free ends of the inner legs in the closed position thereof to bias the seal assembly against the valve disc with a predetermined loading.

20. A butterfly valve as set forth in claim 19 wherein said groove defines a pair of generally parallel sides and a bottom connecting said sides, said outer legs being seated against said bottom and said inner legs being in contact with the adjacent groove sides when in a relaxed condition out of contact with the valve disc;

one of the inner legs being exposed to upstream fluid pressure and being urged out of contact with the adjacent groove side in the closed position of the valve disc to permit fluid pressure to enter the groove behind the upstream inner leg to urge the upstream inner leg into tight sealing contact with the valve disc.

21. A butterfly valve as set forth in claim 20 wherein the seal assembly includes a seat retainer ring having an inner periphery defining said annular groove.

22. In a butterfly valve having a valve body with a flow passage therethrough, an annular groove in the body about the flow passage, and a valve disc mounted in the flow passage for movement between open and closed positions relative to the flow passage;

an improved seal assembly mounted in said groove for sealing against the outer periphery of the valve disc in the closed position thereof, said seal assembly comprising a metallic body and an elastomeric face seal;

said metallic body including a pair of outer legs having outer ends seated in a bottom portion of the groove in a manner to be rigidly held against outward movement therein and a pair of spaced resilient inner legs having inner end portions contacting the outer periphery of the valve disc in the closed position of the valve disc to provide metal-to-metal sealing contact with the outer periphery of the disc along two spaced metallic sealing surfaces formed by the inner end portions of the inner legs, said elastomeric face seal being positioned between the spaced inner legs and contacting the outer periphery of the disc in the closed position of the disc to provide sealing contact therewith along a sealing surface between the spaced metallic sealing surfaces; and said resilient inner legs and said elastomeric face seal being deflected outwardly relative to the seated outer legs upon engagement of said disc with the inner legs and face seal when the disc is moved to the closed position thereby to bias the seal assembly against the valve disc for establishing the three aforementioned sealing surfaces between the seal assembly and the outer periphery of the valve disc when the valve disc is initially moved to the closed position, one of said inner legs being adjacent the upstream side of the flow passage and being deflected downstream upon being exposed to upstream fluid pressure to permit fluid pressure behind the upstream inner leg to urge the upstream inner leg into tight sealing contact with the valve disc.

23. A valve of the type that includes a valve body having an inlet and an outlet and a connecting passageway for providing a flow path for fluid from the inlet to the outlet, wherein the valve comprises:

an annular groove circumscribing the passageway at a location between said inlet and said outlet, said groove having generally parallel sides transverse to said passageway and a bottom connecting said sides;

a valve disc having an annular seal surface defined around the perimeter thereof mounted in said passageway for selective rotation between open and closed positions;

an annular seal assembly mounted in said groove and including a metal portion mounted in said groove and an annular non-metallic resilient seal ring associated with said metal portion, said metal portion defining a pair of outer legs and a pair of inwardly extending legs between which said resilient seal ring is disposed, said outer legs having outer ends thereof seated in close proximity to said groove bottom and the respective associated groove sides in a manner to be rigidly held against outward movement in the groove;

said inwardly extending legs having inner end portions defining a pair of spaced annular metal seal surfaces around the interior of said seal assembly, said pair of annular metal seal surfaces being contacted by said annular disc seal surface and deflected outwardly by the disc when said disc is moved to the closed position, the upstream metal seal ring being urged in the downstream direction by upstream fluid pressure such that the annular seal surface thereof is urged into fluid-tight sealing relation with said annular disc seal surface; and said resilient seal ring and said inwardly extending legs extending inwardly beyond the groove in a free position and operable to seal against said disc annular seal surface when said disc is moved to a closed position, said disc deflecting said resilient seal ring and said metal seal surfaces outwardly when the disc is moved to a fully closed position thereby to provide three sealing surfaces urged continuously toward the disc when same is in the fully closed position.

* * * * *

UNITED STATES PATENT AND TRADEMARK OFFICE
CERTIFICATE OF CORRECTION

PATENT NO. : 4,162,782
DATED : July 31, 1979
INVENTOR(S) : Ronald D. Wilkins

It is certified that error appears in the above-identified patent and that said Letters Patent are hereby corrected as shown below:

Column 6, line 18, change "outer" to -- inner --.

Column 8, line 45, before "metal" insert -- annular --.

Signed and Sealed this

Twenty-ninth Day of July 1980

[SEAL]

Attest:

SIDNEY A. DIAMOND

*Attesting Officer*  *Commissioner of Patents and Trademarks*